United States Patent [19]

Escher

[11] 4,136,673

[45] Jan. 30, 1979

[54] MULTIMODE SOLAR ENERGY COLLECTOR AND PROCESS

[76] Inventor: William J. D. Escher, 506 S. Clinton Ave., St. Johns, Mich. 48879

[21] Appl. No.: 814,289

[22] Filed: Jul. 11, 1977

[51] Int. Cl.² .............................................. F24J 3/02
[52] U.S. Cl. .................................................. 126/271
[58] Field of Search ............... 126/270, 271; 237/1 A; 350/288, 289, 292, 293, 299

[56] References Cited

U.S. PATENT DOCUMENTS

| | | | |
|---|---|---|---|
| 1,880,938 | 10/1932 | Emmet | 126/271 |
| 3,227,153 | 1/1966 | Godel et al. | 126/271 |
| 3,985,119 | 10/1976 | Oakes, Jr. | 126/271 |
| 4,015,584 | 4/1977 | Habermann | 126/271 |

Primary Examiner—Kenneth W. Sprague
Assistant Examiner—James C. Yeung
Attorney, Agent, or Firm—Thomas W. Speckman

[57] ABSTRACT

A solar energy collector providing both concentrating-tracking functions and non-concentrating diffuse absorption functions in a single unit. The solar energy collector and process may provide both a higher temperature heat transfer fluid and a lower temperature heat transfer fluid for utilization in various processes, such as air conditioning, which may advantageously utilize thermal energy of two different temperatures. The solar energy thermal collector and process of this invention provides a high temperature thermal output in combination with a simplified tracking capability.

13 Claims, 4 Drawing Figures

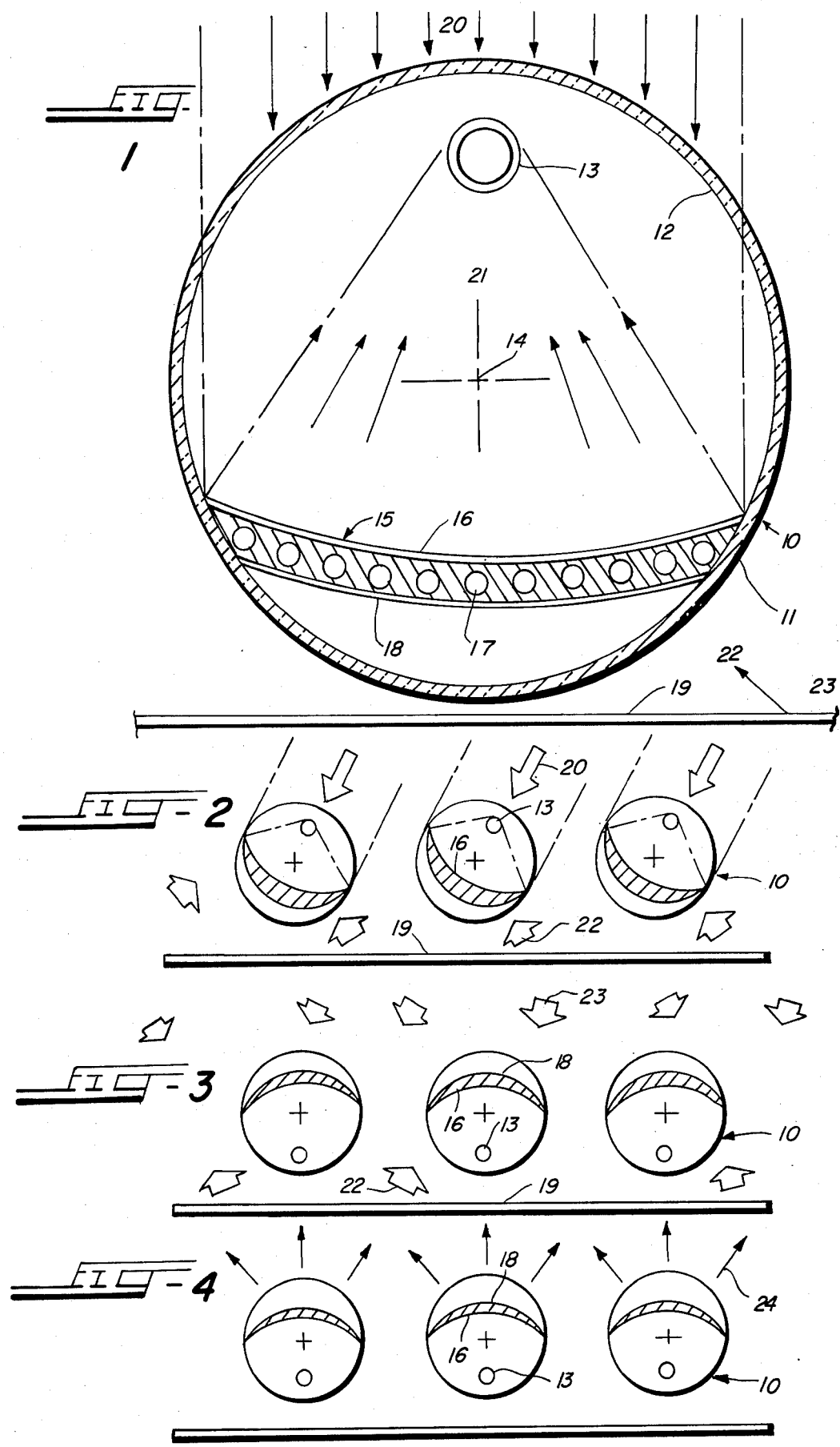

MULTIMODE SOLAR ENERGY COLLECTOR AND PROCESS

This invention relates to an improved solar energy thermal collector which provides multimode collection capabilities. The collector of this invention may provide high temperature heat by absorption of concentrated direct solar radiation and lower temperature heat by absorption of diffuse solar radiation. The collector of this invention provides a concentrating-tracking function and a non-concentrating flat-plate function in a single unit.

The limited availability of primary energy sources and factors of pollution in the utilization of presently utilized primary energy sources makes considerations of utilization of solar energy desirable. Presently utilized solar energy collectors may be divided into two main categories, flat-plate collectors and focusing or concentrating collectors. Each of these types of collectors may be stationary or tracking with respect to its orientation to the angle of incidence of solar radiation. However, high concentration-ratio focusing collectors required for higher temperature heat must be capable of tracking the sun. A review of such collectors and their utilization in connection with heating, cooling and other energy utilization systems is described in "Solar Energy Thermal Process" by John A. Duffie and William A. Beckman, published by John Wiley & Sons, New York, 1974.

One commercially available flat-plate solar collector is more fully described in the PPG Industries, Inc. Technical Services Bulletin, "PPG Prototype Baseline Solar Collector". This is a double glazed hermetically sealed, non-tracking solar collector wherein a black absorbing surface is insulated from the back side and provided with fluid flow tubes for transfer of the absorbed thermal energy to a desired use or storage.

Another type of solar energy thermal collector is the Owens-Illinois, Inc. solar collector marketed under the trademark SUNPAK. The SUNPAK Solar Collector is a triple concentric tubular collector having a central heat transfer fluid feeder tube surrounded by an absorber tube coated with a selective absorber coating on its exterior surface. The heat transfer fluid flows in the space between the central feeder tube and the absorber tube to transfer thermal energy from the absorber. To the exterior of the absorber tube is a cover tube to protect the solar collector system from the weather, the space between the cover tube and the absorber tube being under a vacuum pressure of less than $10^{-4}$ mm of mercury. The tube collectors have a 360° aperture and therefore, may be advantageously spaced for maximum efficiency and the overall performance may be enhanced by reflecting surfaces behind the collector tubes. A series of these tubes may be mounted in appropriate manifold and support systems. However, the tubular solar collector of this type presents the disadvantages that at high sun angles only a fractional portion of the installed area is used due to the spacing between the absorber tubes. The tubular collectors do have the advantage that the absorbing surface always sees the solar source on a diameter and absorbs on a diameter, but has the disadvantage of radiating on the circumference of the absorber tube.

In utilization of flat-plate collectors, the desirability of double glazing to reduce heat loss by convection has been recognized. Further, the desirability of vacuum between the absorber and the cover plate to reduce heat losses has been recognized, but in practice evacuation between flat double glazing presents problems due to the reinforcement necessary to support the flat double glazed structure.

Several types of concentrating solar collectors are commercially available or are presently under development. Both tracking and non-tracking types are included, with the tracking type generally employed since the non-tracking concentrating units are limited to relatively low concentration ratios and low maximum temperatures. An example is the Compound Parabolic Collector developed at the Argonne National Laboratory, Argonne, Ill.

Higher temperatures can be achieved in single-axis tracking concentrating collectors of the lens or mirror type. An example of the lens type is the Northrup, Inc. Fresnel two dimensional lens system and the Polisolar, Ltd. (Switzerland) cylindrical parabolic mirror system, both of which are in commercial operation. These systems are usually configured with the single tracking axis lined up either on the East-West or North-South horizontal reference lines, or in an equatorial mounting in which the rotation axis is parallel with the Earth's axis. Alternatively, they may be set up in the plane of a slanted roof as may be convenient for mounting.

A modification of the single axis tracking system for a cylindrical parabolic reflector introduces a "slow motion" second axis at right angles to a north-south or equatorial type of orientation, or some intermediate positioning, providing for seasonal adjustments to maintain perpendicularity to the sun direction. An example is the "Suntrek" unit marketed by Alpha Solarco.

Still higher temperatures can be achieved by concentrating collectors of lens and mirror types based on shapes of rotation such as parabolic dish reflectors and conventional optical lenses, including Fresnel lenses. These units typically require two axis tracking systems of relatively high tracking accuracy. An array can be made up of such units which would be referred to as a "distributed" collector field. Alternatively, a "central collector" system can be used such as is commonly called the "power tower" concept. In this concept, a large number of two axis tracking heliostats, mirrors which are flat, or nearly so, track the sun in a manner as to focus on a centrally placed and elevated receiver.

A disadvantage of the concentrating systems described above, and similar systems which have been devised, is that the optical surfaces are directly exposed to environmental degradation such as the effects of sand and dust and certain chemical constituents in the air such as sulfur oxides. Wind-driven sand, for instance, poses a definite limitation to desert based solar energy systems of this type. Mirror systems, with their sensitive reflective surfaces, are particularly subject to such degradation. Physical damage by precipitation, particularly hail, can destroy the optical figure of such a reflecting surface. Another disadvantage of these concentrating collectors is their being subject to high loads and especially to high disturbing torques due to meteorological effects, particularly wind and snow. This requires added complicated structure in order to safeguard the collectors and to provide for minimum damage in extreme weather situations.

It is an object of this invention to overcome the above disadvantages of prior solar thermal energy collectors.

It is yet another object of this invention to provide a solar thermal energy absorbing apparatus which provides both concentrating and non-concentrating collection functions in a single unit.

It is yet another object of this invention to provide a solar thermal energy collector which may furnish a portion of its output as high temperature heat and simultaneously a portion of its output as lower temperature heat.

It is another object of this invention to provide a mechanically simple modular collector unit capable of being manufactured in high production numbers.

It is yet another object of this invention to provide a solar thermal collector which may also operate as an efficient heat-rejection system by radiating to the night sky.

It is yet another object of this invention to provide a rugged, long-life solar collector which is highly resistant to environmental degradation and damage, and which can be readily cleaned.

It is yet another object of this invention to provide for a physical configuration which is readily adaptable to the use of high vacuum techniques to reduce convective heat losses and to preserve the integrity of all optical films and coatings utilized in the solar collector module.

It is yet another object of this invention to provide for a standardized solar collector module which can readily be employed in a wide number of solar collector arrays and systems of various overall collector areas in a cost effective building block fashion.

It is yet another object of this invention to provide a modular solar collector unit which can be readily replaced in an overall collector system and further, were it to fail to function, would impact in minimal fashion on the performance of the remaining units.

It is yet another object of this invention to provide a multimode solar collector unit of high overall performance and providing operating flexibility for use in advanced solar total energy systems.

It is yet another object of this invention to provide a solar collector unit which minimizes any adverse effects due to meteorological effects such as wind and precipitation effects and to eliminate or reduce disturbing torques about the rotation axis.

It is still another object of this invention to provide a solar energy collector with a simplified tracking mechanism.

These and other objects, advantages and features of this invention will be apparent from the description and by reference to the drawings wherein preferred embodiments are shows as:

FIG. 1 is a sectional view of a solar thermal energy collector unit according to one embodiment of this invention;

FIG. 2 is a schematic view of solar energy collectors as shown in FIG. 1 showing the position of the collector units in a concentrating-tracking mode;

FIG. 3 is a schematic view of solar energy collectors as shown in FIG. 1 showing the position of the collector units in a flat-plate fixed mode; and FIG. 4 is a schematic view of solar energy collectors as shown in FIG. 1 showing the position of the collector units for night radiation as used in cooling.

FIG. 1 shows collector 10 in cross section according to one embodiment of this invention. The term "collector" as used in this description and in the claims refers to the entire collector unit 10 including the various components as will be described in more detail. Several such collectors may be mounted in spaced parallel relation within a collector mounting. Collector 10 has transparent body tube portion 11 and tube end closures sealed in fluid-tight relation at each end providing a fluid-tight cavity within the tube. The end closures may carry end shafts extending from the tube ends providing rotation about axis of rotation 14. The end shafts may be rotatably mounted with respect to the collector frame in suitable bearings in the collector mounting. Rotation may be provided by a fixably mounted gear on an end shaft so that the collector rotates with the gear. The gear may be rotated by movement of a suitable gear track and suitable motor means to provide tracking-rotation synchronized to sun movement. Alternative rotation means may be employed such as a bell-crank mechanism, chain or belt drive, or equivalent. Either or both an active closed-loop sun-tracking or any open-loop clock-drive system may be utilized for effecting proper orientation.

My invention relates to the multimode solar thermal energy collector. The mechanical means of mounting the tubes and rotation of the tubes may be effected in a number of ways which are apparent to one skilled in the art and do not form a critical part of this invention. For example, the tube end shafts described above may be totally eliminated and the collector tubes 10 mounted by the tube end closures being mounted in any suitable rotatable fashion, such as gearing on the end closure itself, and a rotation means provided so that the reflector tubes rotate up to 180° during each solar energy collecting day. Any suitable power means for obtaining the desired collector tube rotation may be used.

FIG. 1 shows collector 10 having transparent envelope body portion 11. Collector 10 rotates about axis of rotation 14. Concentrator-reflector 16 of cylindrical-paraboloid or parabolic-trough configuration optically is in fixed relation to tube 11 in the path of direct solar radiation and focuses the direct radiation on focal-line high temperature absorber 13 which is in thermal exchange relation with a high temperature fluid conduit. This focusing can be direct without intermediate reflection, or indirect via a secondary smaller reflector, such that the high temperature absorber can be otherwise positioned than as shown in FIG. 1, to gain certain configurational advantage. For example, by means of such configurational folded optics advantage, the absorber could be located integrally with the primary concentrator-reflector, thus simplifying the unit. In this case, the secondary reflector would be a two dimensional contoured reflective strip located on or near the inner surface of the transparent tube in a line symmetrically opposite the primary reflector. Diffuse solar energy absorber 18 is in the path of diffuse solar radiation received directly from the sky or by reflection or re-radiation and in thermal exchange relation with low temperature fluid conduits 17. The concentrator-reflector and the flat-plate or diffuse absorber may be physically separated from each other or may be opposite sides of a combined concentrator-absorber unit shown in FIG. 1 as 15 mounted in fixed relationship within transparent envelope 11. In such case, the non-reflected energy from the direct radiation absorbed by the reflective surface may be utilized to provide additional heat to low temperature fluid conduits 17.

Reflective backing surface 19 reflects solar radiation which is not received by concentrating reflective surface 16 upward toward absorptive surface 18. This surface can be either of a specular or polished, or a diffused optically white, nature. While reflective backing surface 19 is shown as flat, it is within the scope of this invention for reflective backing surface 19 to be of suitable contoured shape, such as parallel parabolic surfaces to maximize the reflectance of the incoming radiation to the absorptive surface 18, the shape being dependent upon the spacing and orientation of adjacent solar collectors 10.

As shown in FIGS. 1 and 2, incoming direct (specular) solar radiation 20 strikes concentrating sun-oriented reflective surface 16 and is reflected in a concentrating fashion to focal-line high temperature absorber 13. Remaining direct and indirect radiation 23 strikes reflective backing surface 19 and is transmitted as reflected radiation 22 toward absorber surface 18. As shown in FIG. 1, the major portion of the incoming direct solar radiation is directed to focal-line high temperature absorber 13 thereby providing high temperature fluid within focal-line high temperature absorber 13 at a temperature of above about 300° F., depending primarily on concentration ratio. The concentration ratio is the solar energy interception area of the concentrator-reflector 16 divided by the illuminated area of the focal-line high temperature absorber 13. Temperatures of about 300° to about 800° F. are attainable for the high temperature fluid in the focal line absorber, about 350° to about 550° F. being the most practical temperatures.

Non-concentrated diffuse solar radiation is absorbed by absorptive surface 18 and by thermal exchange, warms heat transfer fluid passing within low temperature absorber conduits 17, attaining temperatures of about 150° to 250° F. The fluid passing through low temperature absorber conduits 17 may be withdrawn for use as a low temperature heat source or may then be directly passed as preheated fluid to the high temperature fluid conduit of the focal line solar energy absorber 13.

The transparent body of the tubes for the multimode solar energy collector of this invention may be made from any suitable material including various glass and various plastic materials providing high transparency in the desired short wavelength range, low transparency in the thermal range and low reflectance and low absorption throughout the solar energy wavelength range. Any suitable coating or film known to the art may be applied to inside or outside surfaces to increase these properties or to improve durability or maintainability. For example, a thin fractional wavelength coating of magnesium fluoride may be applied to the outside surface to reduce reflective losses. Any anti-static coating may be applied to the outside surface to reduce dust collection.

For a preferred embodiment of this invention it is desired that the transparent body of the tubes provide sufficient mechanical strength to permit a vacuum within the tubes sufficiently low to significantly reduce convective heat losses. In practice, a vacuum of less than about $10^{-4}$ mm of mercury within the tubes is desirable and about $10^{-6}$ mm mercury is preferable and achievable. Suitable vacuums depending upon desired efficiency and tube diameter are in the order of about $10^{-3}$ mm of mercury to about $10^{-8}$ mm of mercury. The upper limit of the vacuum is governed only by materials, technical and economic conditions. By the terminology "tubular" I include cross sections which are round, elliptical or polygonal such as hexagonal, octagonal, and the like. The use of tubular shapes allows such vacuums within the tubes without requiring reinforcement. Further, the use of tubular shapes allows less thickness of glass or plastic than does flat double glazing and thereby reduces undesired glazing absorptance and refractive distortion.

The end closures may be any suitable material, usually metal or plastic or the same material as the transparent envelope, which provides the desired strength and mechanical configuration. The closure at at least one of the end tubes provides suitable connections for the high temperature fluid conduit of focal line absorber 13 and the low temperature fluid conduits 17 to exterior manifolds or other desired passage of heat transfer fluid to and from these conduits. One of the ends may simply be a continuous domed section of the transparent tube material not pierced for working fluid flow conduits and the heat transfer fluid introduced and removed from the same end by loop or concentric tube flow.

The concentrator-reflector 16 mounted within the solar energy collector and the reflective backing surface 19 may be any suitable metallic, synthetic or glass surface either made of or coated with a material having high reflectance in the solar spectral range. Such materials include chemically or electroplated silver, high purity aluminum, sputtered aluminum, optical reflectors, bytral processed aluminum, back-silvered glass, aluminum with silicon oxide coating, aluminum foil, back aluminized acrylic plates, aluminized Mylar sold by DuPont, or any other suitable material providing desired reflectance within the solar energy range. Unlike the case of other concentrating-type solar collectors, the concentrating reflective surface is protected from deterioration by the transparent tube and the high vacuum environment.

The focal-line absorber 13 and absorber surface 18 may have any suitable "black body" absorber surface. It is desired that the absorber have high absorptance for the received solar energy and low emittance for long-wave radiation at temperatures of the solar energy absorber. A number of "black" surfaces are known to include various "nickel black", "chrome black", "copper black" and other known selective surfaces for solar energy absorption such as summarized in Table 5.6.1 of the book referred to above, "Solar Energy Thermal Processes". The absorber must also conduct the absorbed thermal energy to heat transfer fluid which may be in contact with the absorber in any suitable fashion. For example, in FIG. 1, fluid conduits 17 are shown separate from absorber surface 18, but it should be clear that the conduits may have any number of alternative configurations such as being tubes in an expanded metal sheet which is coated for absorptance.

Any suitable configuration of heat transfer fluid flow may be utilized including single and multiple pass and coaxial flow. The heat transfer fluid with the absorbed energy from the solar energy absorber may be removed from the collectors and passed in any desired fashion to an energy storage means or to direct utilization in any desired process, such as electricity generating, heating or air conditioning applications. It is one feature of this invention that a higher and lower temperature heat source, as in a solar total energy system, may be supplied to processes utilizing or requiring different temperature levels of thermal energy input.

A cover plate may be provided to the exterior of the collector tubes for weather protection and reduction of convective loss. The cover plate may be made of any suitable material which provides high transparency, low reflectance and low absorption with low refraction in the incident beam solar energy wavelengths. Suitable glass and plastic materials are known for this purpose.

FIG. 2 schematically shows the operation of multiple parallel multimode solar energy collectors according to this invention in the concentrating-tracking mode of operation. The direct solar radiation, denoted by arrow 20, strikes concentrator-reflector surface 16 and is focused on focal line absorber 13. A tracking system provides rotation of the collectors to maximize concentration and effects focusing of the solar energy on the focal-line absorber. Rotation of the reflector tubes may be continuous or intermittent to the extent desired to obtain the best average orientation angle. The time and incident angles of solar radiation at various points on the earth are known and the desired rotation of the solar collectors of this invention may be readily ascertained by one skilled in the art. Likewise, the mecanism for rotation of the solar collector may be readily adapted from the state of the art and applied to the apparatus of this invention. Direct solar radiation and indirect solar radiation which passes between adjacent solar collectors 10 is reflected by reflective backing surface 19 as reflected radiation 22 and the energy is absorbed on absorptive surface 18. Further, energy radiated away from one collector unit may be directly or indirectly received by another collector unit. The two modes of energy absorption provide lower temperature heat transfer fluid in absorber conduits 17 and higher temperature heat transfer fluid in the focal-line absorber 13 when direct solar radiation is available.

FIG. 3 shows the solar collectors of this invention in a non-concentrating mode of operation. Normally, the collector units would be fixed in this configuration. However, tracking can be used to maximize diffused radiation input if this proves advantageous. Indirect solar radiation, indicated by arrows 23, as obtained on a hazy or coudy day, strike directly upon absorber surface 18 providing thermal energy to the heat transfer fluid in low temperature absorber conduits 17.

FIG. 4 shows the solar collectors in a night-effect cooling mode. The absorber surface faces upward toward the night sky acting as a radiator with energy in effect removed to the night sky thermal sink. Thus, cooling of the working fluid may be achieved by such night operation for direct application to air conditioning uses or for other thermal rejection purposes.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. A multimode solar energy collector comprising: a transparent tubular body portion having end closures sealing each end of said body portion providing a fluid-tight cavity within the tube, a concentrator-reflector within and in fixed relation to the tube, a focal-line solar energy absorber in the focus of said concentrator-reflector, a high temperature fluid conduit in thermal exchange relation with said focal-line solar energy absorber, a diffuse solar energy absorber within the tube in the path of reflected or diffuse solar radiation, a low temperature fluid conduit in thermal exchange relation with said diffuse solar energy absorber, heat exchange fluid in said conduits and means for introducing and withdrawing the heat exchange fluid from said collector, said concentrator-reflector being in the path of direct solar radiation and focusing said direct radiation to said focal-line absorber and said diffuse absorber being in the path of reflected or diffuse solar radiation.

2. The multimode solar energy collector of claim 1 wherein said cavity is evacuated to about $10^{-3}$ mm to about $10^{-8}$ mm of mercury.

3. The multimode solar energy collector of claim 1 wherein said cavity is evacuated to about $10^{-4}$ mm to about $10^{-6}$ mm of mercury.

4. The multimode solar energy collector of claim 1 wherein said focal-line solar energy absorber is coated with a selective coating enhancing absorption of solar energy of the wavelengths received by said focal line absorber.

5. The multimode solar energy collector of claim 1 wherein said concentrator-reflector, diffuse solar energy absorber and low temperature fluid conduits comprise a single concentrator-absorber unit.

6. A multimode solar energy collector assembly comprising:
   a series of parallel multimode solar energy collectors comprising; a transparent tubular body portion having end closures sealing each end of said body portion providing a fluid-tight cavity within the tube, a concentrator-reflector within and in fixed relation to the tube, a focal-line solar energy absorber in the focus of said concentrator-reflector, a high temperature fluid conduit in thermal exchange relation with said focal-line solar energy absorber, and a diffuse solar energy absorber within the tube in the path of reflected or diffuse solar radiation, a low temperature fluid conduit in thermal exchange relation with said diffuse solar energy absorber, heat exchange fluid in said conduits and means for introducing and withdrawing the heat exchange fluid from said collector, said concentrator-reflector being in the path of direct solar radiation and focusing said direct radiation to said focal-line absorber and said diffuse absorber being in the path of reflected or diffuse solar radiation;
   a collector mounting means for rotably mounting said collectors;
   motor means providing tracking-rotation of said collectors; and
   a reflective backing surface below said collectors reflecting solar radiation upward toward said collectors.

7. The multimode solar energy collector assembly of claim 6 wherein said cavities are evacuated to about $10^{-3}$ mm to about $10^{-8}$ mm mercury.

8. The multimode solar energy collector assembly of claim 7 wherein said reflective backing surface comprises contoured surfaces directing reflectance to the plate absorbers.

9. A process for multimode solar energy absorption comprising; passing high temperature heat exchange fluid in thermal exchange relation with a focal-line solar energy absorber, said focal-line absorber being in the focus of a concentrator-reflector both in a fluid-tight cavity within a transparent tube, placing said concentrator-reflector in the path of direct solar radiation focusing said direct solar radiation to said focal-line absorber and passing low temperature heat exchange fluid in thermal exchange relation with a diffuse solar absorber within said cavity, diffuse solar radiation being reflected to said diffuse absorber.

10. The process of claim 9 wherein said high temperature heat exchange fluid is heated to a temperature of above about 300° F.

11. The process of claim 10 wherein said high temperature heat exchange fluid is heated to a temperature of about 350° to 550° F.

12. The process of claim 9 wherein said low temperature fluid reaches a temperature of about 150° to 250° F.

13. The process of claim 9 wherein said low temperature fluid is first heated by said diffuse absorber and then passed to said focal-line absorber as heat exchange fluid.

* * * * *